Oct. 20, 1970 D. C. W. JERRARD ET AL 3,534,974

TRANSPORT DEVICES FOR DOMESTIC APPLIANCES

Filed Aug. 5, 1968 5 Sheets-Sheet 1

TRANSPORT DEVICES FOR DOMESTIC APPLIANCES

Filed Aug. 5, 1968 5 Sheets-Sheet 2

United States Patent Office 3,534,974

Patented Oct. 20, 1970

3,534,974

TRANSPORT DEVICES FOR DOMESTIC APPLIANCES

Douglas Charles William Jerrard, Chipstead, Harold Noel Jerrard, Mitcham, and Anthony William Severs and William Henry Severs, Carshalton, England, assignors to Severard Limited, Sutton, Surrey, England Filed Aug. 5, 1968, Ser. No. 750,041
Int. Cl. B62d 21/18
U.S. Cl. 280—43.24 5 Claims

ABSTRACT OF THE DISCLOSURE

A transport device for partially supporting a domestic appliance which device comprises a support element, a roller, and operating means arranged so as to be capable of providing relative motion between the roller and the support element, the arrangement being such that with the device secured to partially support a domestic appliance on moving the operating means to an operative position, relative motion between the roller and support element results in the partial support of the appliance being transferred from the support element to the roller, and on moving the operating means to the inoperative position, the support element is brought into frictional contact with the surface to partially support the appliance thereby restraining translational movement of the appliance.

The present invention relates to transport devices for domestic appliances and is particularly concerned with a device to enable an appliance to be moved from time to time but to occupy a static pre-selected position when desired. Domestic appliances such as washing machines, refrigerators and cookers when permanently secured at a fixed point in a kitchen present considerable difficulty in cleaning behind and underneath the appliance. There is, however, need for an appliance which will normally remain in position against a wall but which can easily be moved so that the space behind the appliance can be cleaned.

Hitherto, gas cooking appliances have been permanently fixed into position by rigid gas pipe connections supplying gas thereto and no provision has been made for moving the cooker from time to time for cleaning purposes. It is now possible to provide a removable appliance by the use of flexible gas pipes. However, in view of the weight of the average gas cooking appliance, it is still not capable of being easily transported.

It is well known to provide a wheeled domestic washing machine which can normally be stowed away at a convenient place in the kitchen when not in use and then wheel the machine to a position close to a sink unit when required for use. A disadvantage of such an appliance is that it tends to move about when in use or stowed away. This is clearly undesirable for safety reasons in the case of a gas or electric cooker. It has been proposed to provide a wheeled base incorporating a securing device for anchoring such a cooker in its normal position in the kitchen. This device, while eminently satisfactory, necessitates the fixing of the wheeled element of the device to the cooker and a cooperating element of the securing device to the wall.

According to the present invention there is provided a transport device adapted to be secured to a domestic appliance, which device comprises at least one support element, at least one roller and operating means capable of providing relative motion between said roller and said support element, the arrangement being such that with the device secured to an appliance on moving the operating means to an operative position, relative motion between the roller and the support element results in the support of the appliance being transferred from the support element to the roller and on moving the operating means to an inoperative position, the support element is brought into frictional contact with said surface to support the appliance thereby restraining translational movement of the appliance.

The present invention also provides a transport device for partially supporting a domestic appliance which device comprises a support element, a roller, and operating means arranged so as to be capable of providing relative motion between the roller and the support element, the arrangement being such that with the device secured to partially support a domestic appliance, on moving the operating means to an operative position, relative motion between the roller and support element results in the partial support of the appliance being transferred from the support element to the roller and on moving the operating means to the inoperative position, the support element is brought into frictional contact with the surface to partially support the appliance thereby restraining translational movement of the appliance.

In one embodiment of the present invention, the operating means acts to move the roller relative to the support element and the operating means includes a cam. The operating means may also include a lever which on movement from an inoperative position through an arc of not more than 90° moves the roller relative to the support to a position in which the said roller partially supports the appliance. The roller may be supported in a cranked portion rotatable about a support element, the arrangement being such that movement of the operating means causes the roller to move through an arc from an inoperative position in which it contributes no support to the appliance to an operative position in which the roller partially supports the appliance.

In another embodiment of the present invention, the transport device compries four rollers and four support elements each of said rollers and support elements being located at or towards a corner of the underside of an appliance to which the base is adapted to be fixed and wherein all of said rollers are coupled to said operating means to enable them to be simultaneously moved relative to the support elements the arrangement being such that with the operating means in the inoperative position, the said appliance is supported wholly by the support elements and with the operating means in the operative position said appliance is supported wholly by the rollers.

According to a further embodiment of the present invention, the operating means includes cam means which acts to provide relative movement between the roller and the support element. The device incorporating the cam means may include a pair of spaced support elements adapted to be secured to the underside of an appliance which support elements are joined by an adjustable elongate spacing element extending therebetween and fixed to each of the support elements and a pair of rollers carried on a common adjustable axle journalled at each end for rotation in the support element capable of restricted vertical movement with respect to said support elements.

In an alternative embodiment of the present invention, the support elements are arranged to move relative to the rollers, in which case the transport device may comprise a support element, an axle journalled for rotation in said support element which support element is capable of restricted vertical motion with respect to the axle, a roller mounted on the axle and freely rotatable thereon, cam operating means fixed to said axle and adapted to engage abutments on the support element and means to rotate said axle the arrangement being such that on moving said operating means from an inoperative to an operative position, the axle rotates so that the abutment on the support member moves down the cam surface to permit the roller to come into rolling contact with the surface on which the device stands.

Typical examples of the operating means for producing relative motion between the roller and the support element may also include a worm gear acting on a pinion, a screw threaded support element movable with respect to the roller and a lever for moving said roller arcuately from a rest position into rolling contact with the surface on which the appliance stands.

Following is a description by way of example and with reference to the accompanying drawings of several embodiments of transport devices in accordance with the present invention.

Figures 1, 2:
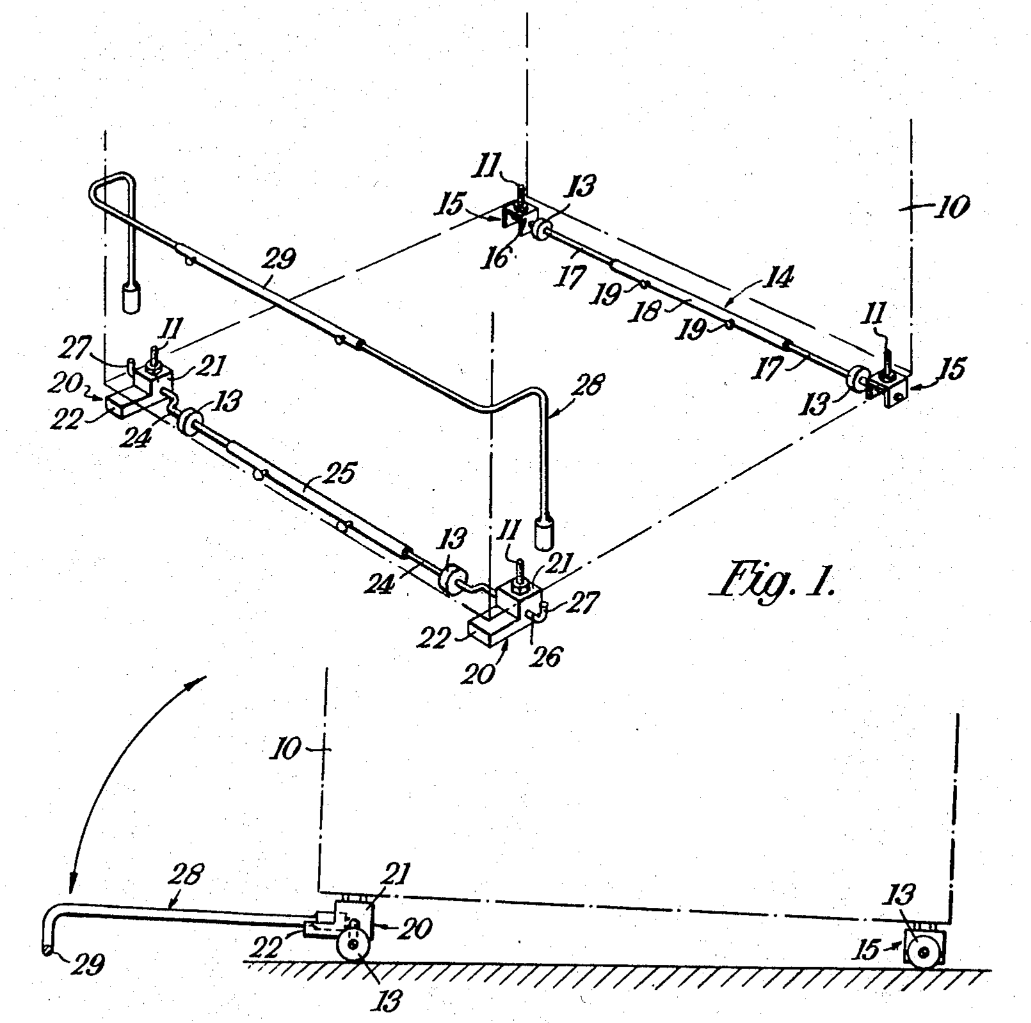
FIG. 1 is a perspective view of of a transport device in accordance with the present invention.
FIG. 2 is a side view of the embodiment illustrated in FIG. 1.

Turning now to the embodiment illustrated in FIGS. 1 and 2 a domestic appliance 10 having an underside of rectangular form is provided with a screw threaded sockets at or toward each corner of the underside of the appliance; said sockets being adapted to receive screw threaded studs 11 which enable the base 12 to be secured to the applicance. The base is provided with four rollers 13, each of which is located on the base at or towards the corners thereof.

The rearward rollers 13 of the base are mounted towards the ends of an elongate axle 14 which extends between two inverted U-shaped brackets 15 each having an upwardly extending screw threaded stud 11 which is screwed into the appropriate socket of the appliance 10 and which serves to secure the elongate axle 14 to the appliance. The ends of the axle 14 are each supported in both arms 16 of one of the U-shaped brackets 15, and a roller 13 is mounted for free rotation about the axle 14 adjacent the inward arm 16 of each bracket. The elongate axle 14 is formed of two axle portions 17 which are joined together by a central sleeve 18 having two setscrews 19. The ends of the two axle portions 17 towards the centre pass into the sleeve 18 and are clamped thereto by the setscrews 19 thus enabling the length of the axle 14 to be adjusted to suit the particular appliance to which the base 12 is to fixed.

The forward part of the base 12 is formed by two support elements or feet 20 each provided with an upwardly extending screw threaded stud 11 adapted to be screwed into a forward socket of the appliance 10. Each support element 20 is formed of an erect portion 21 of substantially square cross section and having at the lower end thereof a projecting portion 22 which, when the support element 20 is fixed to the appliance, projects forward of the point of attachment to the appliance 10 at right angles to the axis of the erect portion 21 so as to minimize tendency of the appliance 10 to tip when the forward portion of the appliance 10 is supported by the feet 20.

The erect portions 21 of each of the feet 20 are provided with a drilling which forms a bearing for a cranked axle 23 capable of limited rotation in said bearing, and formed of two cranked axle portions 24 joined by a central sleeve 25. Each of the axle portions 24 has a double crank on that part of the axle portion 24 extending inwardly of the feet 20 and has on the inward side of the double cranked part of the axle a roller 13 mounted for free rotation about the axle portion 24. The sleeve 25 joining the two axle portions 24 allows adjustment of the axle length to suit the particular appliance to which the base 12 is to be applied.

Each end 26 of the axle 23 extends from the associated support element 20 beyond the side of the appliance 10 and terminates in a cranked portion so as to form a small lever 27 so that the plane containing the small cranked lever 27 and the axis of rotation of the axle portions 24 in the feet 20 is substantially perpendicular to the plane containing the axis of rotation of the rollers 13 and the axis of rotation of the axle portions 24 in the feet 20. The short cranked lever 27 is adapted to be engaged by a detachable handle 28 which enables a mechanical advantage to be applied to the lever 27 the arrangement being such that with the handle 28 in a vertical position the forward part of the appliance 10 is supported by the feet 20 which are in frictional contact with the surface on which the appliance 10 stands thereby restraining translational movement of the appliance 10. On moving the handle 28 forwards and downwards through an arc, the rollers 13 mounted on the cranked axle 23 move through a corresponding arc until they come into contact with the surface on which the appliance 10 stands, continued downward movement of the operating handle 28 causing the rollers 13 to move in such a way as to lift the forward portion of the appliance 10 so that the appliance 10 is supported wholly on rollers 13 and is capable of translational movement. In order to secure the appliance 10, the appliance 10 is moved to its desired location and the handle 28 is then moved upwards until the forward portion of the appliance 10 is supported by the support elements 20 in which case the handle 28 may be detached from the short cranked lever 27.

The detachable handle 28 is formed from a length of tubing having an inverted U-shaped form, the ends of the handle 28 being spaced so as to cooperate with the cranked levers 27 projecting from each side of the base of the appliance 10. The bridging portion 29 of the handle 28 is cranked forward so as to prevent fouling of the forward portion of the appliance 10 when the handle 28 is applied to the cranked levers 27 when the rollers 13 are in the rest position.

Figure 3:
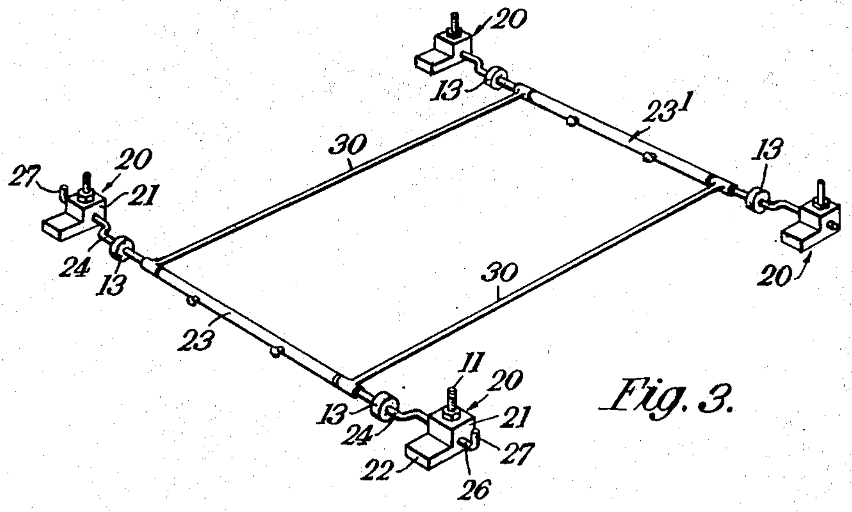
FIG. 3 is a modification of the embodiment illustrated in FIGS. 1 and 2.

In the alternative embodiment of a portable base of the present invention illustrated in FIG. 3, the base 12 is provided with four feet 20 and four rollers 13, each of which rollers 13 is movable relative to the said feet 20. The rearward pair and forward pair of rollers 13 are mounted on cranked axles 23, 23' in the manner described with respect to the embodiment illustrated in FIGS. 1 and 2 above, only it is not necessary to provide the rearward axle with a cranked portion at each end thereof. In this embodiment each of the cranked portions 24 of the axles 23, 23' are coupled by coupling rods 30 of the same length as the distance separating the axis of rotation relative to the base of each of the axles, the ends of said coupling rods being swivellably mounted about the cranked portion 24 of each of the axles 23, 23' between the roller 13 and of the adjusting sleeve 25. The length of each of the coupling rods 30 is preferably adjustable in the manner similar to the adjustment provided on each of the axles 23, 23' as described above.

The operation of each of the axles 23, 23' is as described above except that the motion imparted to the forward axle 23 by the handle 28 applied thereto is transmitted to the rearward axles 23' by means of the coupling rods 30 so that in the rest position the appliance 10 to which the base 12 is applied is supported wholly by the feet 20. With the handle 28 in the operative position each of the rollers 13 moves in a manner to raise the appliance 10 so that the support elements 20 are not in contact with the surface on which the appliance 10 stands so that the appliance 10 is supported wholly by the rollers 13 and is thus capable of translational movement on the rollers 13.

Each of the bases to be described with respect to the embodiments illustrated in FIGS. 4 to 9, 10 to 15 and 16 of the accompanying drawings is adapted to be secured to the underside of the forward portion of the base of a domestic appliance and used in conjunction with separate free rollers fixed to the rear of the appliance.

Turning now to the embodiment illustrated in FIGS. 4 to 9, the base 40 comprises a pair of spaced support elements 41 each of which comprises a mild steel rectangular bracket 42 having a pair of elongate substantially vertical sides 43, a substantially square top 44, and a base 45, the base 45 of the support 41 projecting forwardly of the remainder thereof. The top 44 of the bracket 42 is provided with a centrally disposed upstanding threaded member 46 adapted to secure the base to the underside of an appliance.

Each side 43 of the support bracket 42 is provided towards the lower portion of the bracket 42 with an elongate vertically disposed slot 47. The support bracket 42 are spaced apart by an elongate adjustable spacing rod 48 extending substantially horizontally between the support brackets 42. The spacing rod 48 includes a central sleeve portion 49 each end of which accommodates the ends of an outer rod 50, said outer rods 50 being slidable in said sleeve 49 and being secured thereto by means of set screws 51. The central sleeve portion 49 is provided with a vertical drilling 52 for the purpose hereinafter described and the spacing rod 48 is located substantially vertically above the elongate slots 47 in the support brackets 42.

The elongate slots 47 in the support bracket 42 accommodate a horizontally disposed axle 53 extending between the brackets 42, so that said axle 53 is capable of restricted vertical motion with respect to the support brackets 42. The axle 53 comprises a pair of outer rod elements 54 coupled by a central sleeve portion 55 to which the rod elements 54 are secured by means of set screws (not shown) to allow for axial adjustment of the axle 53. Each of the rod elements 54 of the axle 53 carries rotatably mounted thereon a roller 56 disposed between the edge of the sleeve portion 55 of the axle 53 and the support bracket 42.

The sleeve portion of the axle is also provided with a substantially vertical diametric drilling 52' which is arranged to cooperate with the corresponding drilling 52 of the spacing rod 48, said cooperating drilling 52, 52' accommodating a vertical pivot shaft 57, the arrangement being such that relative vertical movement between the axle 53 and the spring rod 48 does not alter the vertical disposition of said pivot shaft 57.

An operating means in the form of a lever 58 is pivoted at one end thereof by means of said pivot shaft 57 passing through said cooperating drillings 52, 52' in the spacing rod 48 and in the axle 53, and is disposed between said spacing rod 48 and said axle 53 and is capable of arcuate movement in a horizontal plane.

The operating handle or lever 58 carries at the end towards its pivot, an expanded portion extending from the lever through an arc subtending at the pivot an angle of approximately 90° to form a quadrant portion 59. Said quadrant portion 59 is provided with a cam surface 60 which increases in thickness along the arcuate periphery thereof in a direction away from the handle 58 which cam surface 60 engages between the spacing rod 48 and the axle 53 so that with the handle 58 lying at a small angle with respect to the spacing rod 48 and axle 53, the thinner part 61 of the peripheral edge of the quadrant is in abutting relationship with the spacing rod 48 and the axle 53 and the support brackets 42 are in frictional contact with the surface upon the appliance stands (see FIGS. 5 and 7).

In use, the base 40 is secured to the forward portion of a domestic appliance having a substantially square or rectangular base by means of stud 46 and a freely rotatable roller 56' supported in an inverted U-shaped bracket 62 is mounted at each of the rear corners of the base of the appliance by means for an upstanding screw threaded stud 46' so as to allow translational movement of the appliance in a forward and rearward direction.

Figures 4, 5, 6, 7, 8, 9:
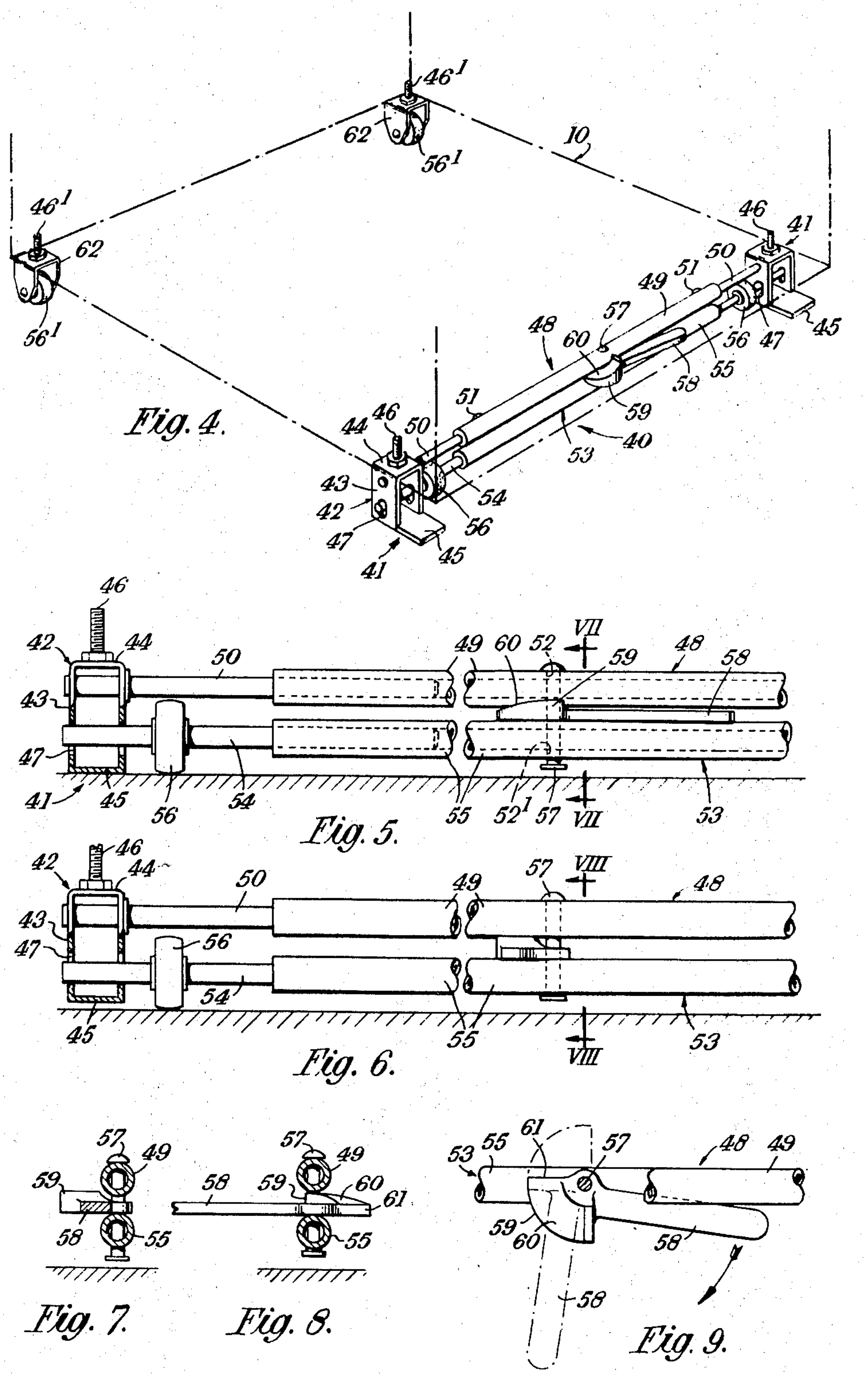
FIG. 4 is a perspective view of an embodiment of a transport device including a cam operating means.
FIG. 5 is a part side view of the transport device illustrated in FIG. 4 in which the operating means is in the inoperative position.
FIG. 6 is a part side view of the transport device illustrated in FIG. 4 in which the operating means is in the operative position.
FIG. 7 is a section along the line VII—VII of FIG. 5.
FIG. 8 is a section along the line VII—VII of FIG. 6.
FIG. 9 is a detail of FIGS. 4 to 8.

With the operating lever 58 in an inoperative position, that is to say, at a small angle with the spacing rod 48 and axle 53, the forward portion of the domestic appliance is supported on the support brackets 42 which are in frictional contact with the surface on which the appliance stands (see FIGS. 5 and 7). On moving the operating lever 58 arcuately to an operating position in which the operating lever 58 is substantially perpendicular to said spacing rod 48 and axle 53, the cam surface 60 contained on the radially disposed quadrant 59 of the operating lever 58 acts to increase the space between the axle 53 carrying the rollers 56 and the spacing rod 48 and move the rollers 56 downwardly with respect to the support brackets 42 to move the brackets 42 out of contact with the surface on which the appliance stands thereby permitting translational movement of the appliance (see FIGS. 6 and 8).

On moving the operating lever 58 to an inoperative position, the weight of the forward portion of the appliance acts upon said rollers 56 to maintain the axle 53 carrying the rollers 56 in abutting relationship with the cam surface 60 on the operating lever 58, thereby permitting a reduction in the spacing between the axle 53 and the spacing rod 48 and allowing upward vertical movement of the rollers 56 with respect to the support brackets 42 to bring the support brackets 42 into frictional contact with the surface upon which the appliance stands thereby restraining translational movement of the appliance.

Turning now to the embodiment of the present invention illustrated in FIGS. 10 to 15, the base 70 includes a pair of support members 71 each of which comprises a vertically disposed substantially symmetrical trapezoidal portion 72 having a substantially rectangular base element 73 projecting outwardly from the longer parallel side thereof and an upper projecting abutment 74 projecting outwardly of the shorter parallel side of said trapezoidal portion 72. The trapezoidal portion 72 of each support member 71 is provided with a substantially vertical elongate slot 75 disposed along the vertical symmetry axis of said trapezoidal portion 72.

Each of said members 71 is adapted to receive a substantially horizontally disposed elongate axle 76 extending therebetween and located in the elongate slot 75 for restricted vertical movement with respect to the support member 71.

The axle 76 extending between the members comprises a pair of rod elements 77 adjustably secured in each end of a central connecting sleeve 78 to allow adjustment of the spacing between the members 71 described above.

The axle 76 carries at each end thereof toward each support member 71 a freely rotatable roller 79, and disposed between the freely rotatable roller 79 and the support member 71, is an inverted U-shaped bracket 80 having a drilling in each depending arm 81 thereof to receive the rod elements 77 of the axle 76. The intermediate portion 82 of said inverted U-shaped bracket 80 is provided with an upstanding threaded element 83 for attachment to the underside of the appliance to which the base 70 is to be secured. The outer arm 81 of the U-shaped bracket 80 is adapted to engage with one or more guide elements 84 secured to or forming part of the inner surface of the support member 71 so as to prevent or restrict relative rotation of the inverted U-shaped bracket 80 with respect to the support member 71 and to allow limited vertical sliding motion of the support member 71 relative to the U-shaped bracket 80 (see FIG. 15).

The axle 76 passing through each support member 71 is provided at the outer end thereof with an eccentrically mounted metal disc 85 which constitutes a cam surface adapted to abut the upper surface of the outwardly projecting base 73 of the support member 71 forming the abutment said eccentrically mounted disc 85 being arranged to rotate with said axle 76. The operating means comprises a forwardly projecting lever 86 secured to one or other of the rods 77 comprising the axle 76 and having at the outer end a pedal 87, the arrangement being such that movement of the lever 86 causes limited rotation of the axle 76 so that the cam surface engages the corresponding abutment surface 73 on each support member 71 to move the support member 71 relative to the axle 76 and rollers 79.

In operation, the base 70 described above is attached by means of the upstanding threaded elements 83 on the intermediate portions 82 of the inverted U-shaped brackets 80 to the base of the appliance, the arrangement being such that the operating lever 86 fixed to the axle 76 projects forwardly of the base 70. The forward corners of the appliance are each provided with a freely rotatable roller in the manner described with respect to the previous embodiment, the arrangement being such that, with the rollers 79 of the base in rolling contact with the surface on which the appliance stands, the appliance is capable of translational movement in a forward-rearward direction.

Figure 13:
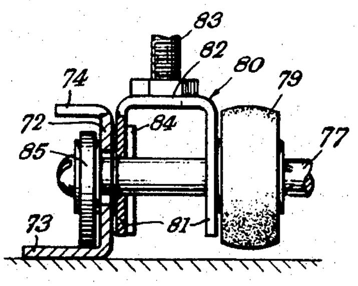
FIG. 13 is a part end view, partly in section, of FIG. 11 but with the operating means in the inoperative position and the roller out of contact with the surface.
Figure 14:
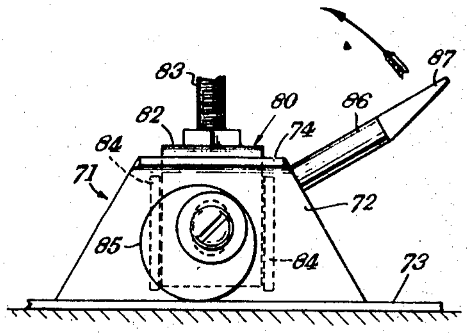
FIG. 14 is a side view of the device shown in FIG. 13.
Figures 17, 18:
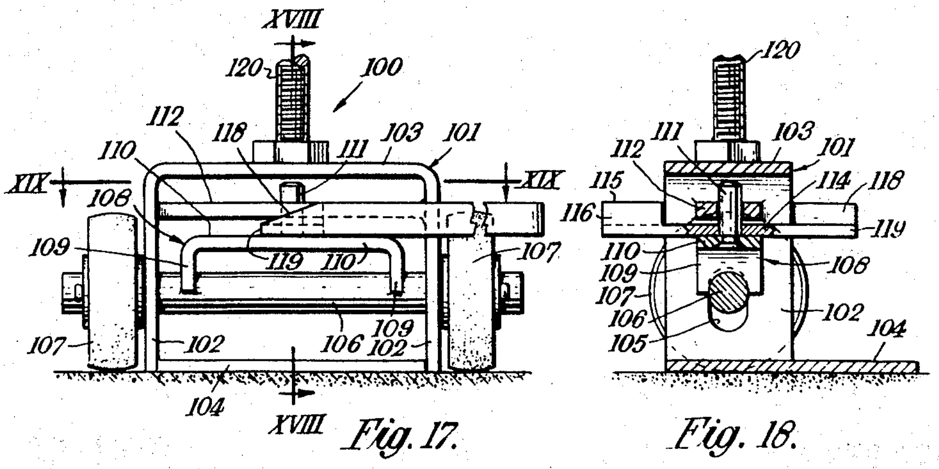
FIG. 17 is an end elevation of a further embodiment of the transport device of the present invention in which the support is in contact with the surface.
FIG. 18 is a section along the line XVIII—XVIII of FIG. 17.
Figure 19:
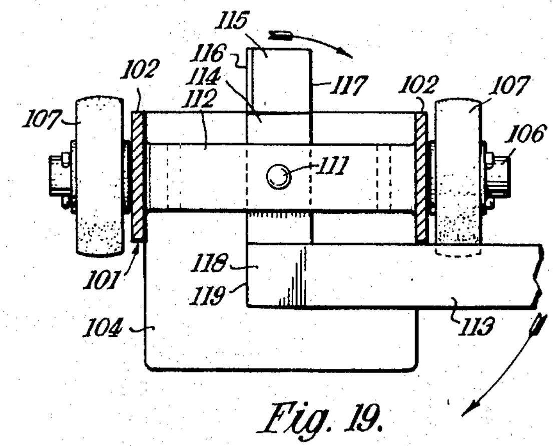
FIG. 19 is a section along the line XIX—XIX of FIG. 17.
Figure 20:
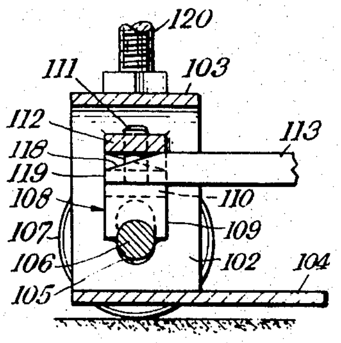
FIG. 20 is a section along the line XVII—XVII of FIG. 17 but with the support raised clear of the surface.

With the lever 86 in an upper inoperative position, the cam surface of the cam 85 is disposed with respect to the abutment surface 73 so that each support member 71 is displaced downwardly with respect to the rollers 79 so that the rectangular base 73 of each support member 71 is in frictional contact with the surface upon which the appliance stands thereby restraining translational movement of the appliance (see FIG. 13).

Movement of the operating lever 86 downwardly through an arc to a lower operative position results in corresponding rotation of the axle 76 carrying the rollers 79 and corresponding rotation of the cam 85 attached thereto to cause upward vertical movement of the support member 71 with respect to the axle 76 thereby transferring the weight of the appliance from the support members 71 and on to the rollers 79 so that the appliance is capable of translational movement.

To secure the appliance, the operating lever 86 is moved upwardly from the operative to the inoperative position thereby causing lowering of the support members 71 with respect to the U-shaped brackets 80, to which the appliance is attached, until the support members 71 are in supporting contact with the surface upon which the appliance stands, and supports the forward part of the appliance thereby restraining translational movement of the appliance.

In a modification of the previous embodiment, a base 70 (FIG. 16 of the accompanying drawings) is adapted to be secured to one corner preferably the forward corner, of the appliance, and is adapted partially to support the appliance. The base 70 comprises a pair of spaced support members 71 of the kind described above with respect to the previous embodiment, and an axle 76 journalled for rotation in slots 75 in said support members 71 and in the depending arms 81 of an inverted U-shaped bracket 80, so as to be capable of relative vertical movement with respect to said support members 71. The spaced support members 71 are disposed each side of the inverted U-shaped bracket 80 which has an upstanding threaded portion 83 extending from the intermediate portion 82 of the inverted U-shaped bracket 80 for securing the base 70 to a corner of the appliance. The axle 76 carries a pair of freely rotatable rollers 79 which are disposed one either side of the bracket 80 and between said bracket 80 and the support member 71.

The operating means comprises a lever 86 secured to projecting end 90 of the axis 76 so that movement of the lever 86 causes rotation of the axle 76 and corresponding rotation of the cam 85 secured thereto to cause or allow relative movement between the support 71 and the inverted U-shaped bracket 80 in the manner described in the previous embodiment.

Figures 10, 16:
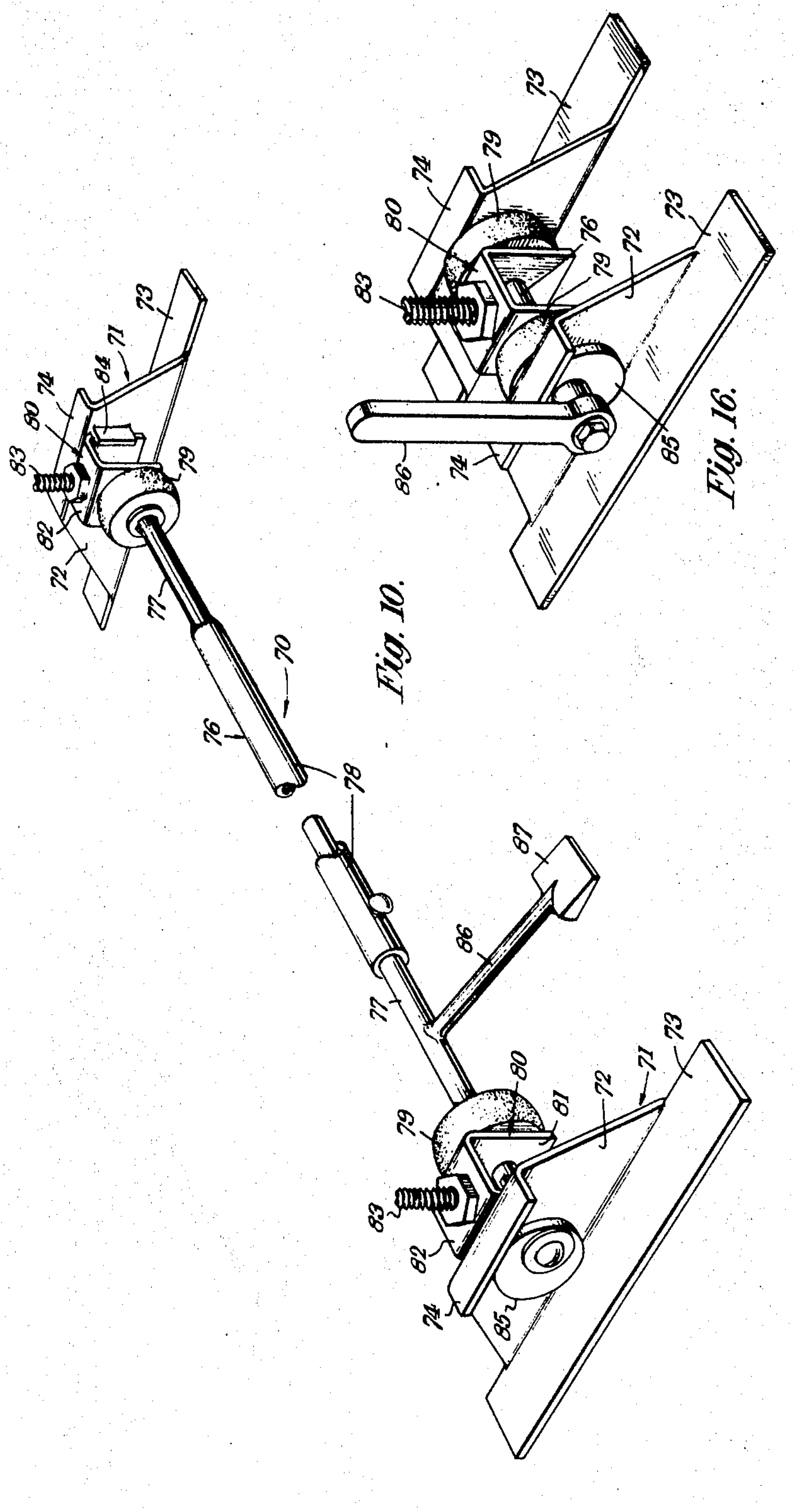
FIG. 10 is a perspective view of another embodiment of the transport device in accordance with the present invention in which the supports move relative to the rollers.
FIG. 16 is an alternative embodiment of the device illustrated in FIGS. 10 to 15.
Figure 11:
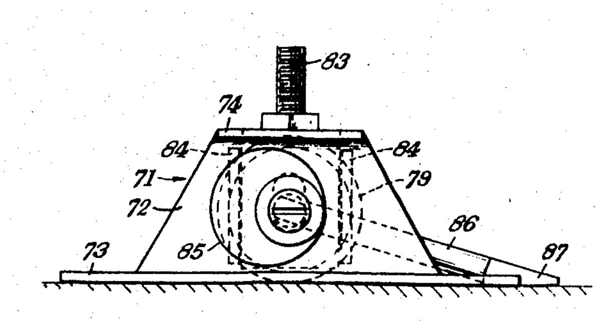
FIG. 11 is a side view of the device illustrated in FIG. 10 with the operating means in the operative position.
Figure 12:
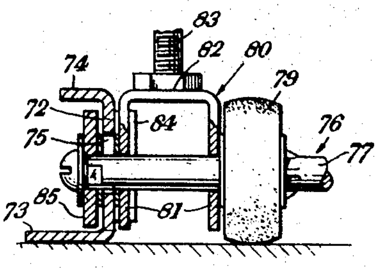
FIG. 12 is a part end view partly in section, of FIG. 11.
Figure 15:
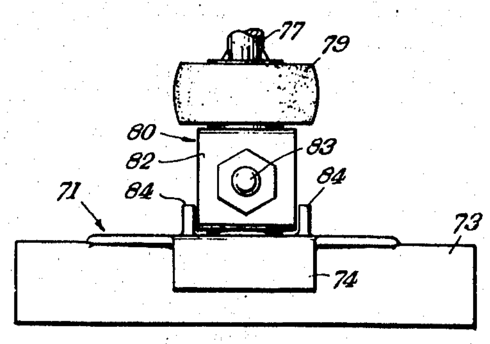
FIG. 15 is a part plan view of the device shown in FIGS. 10 to 14.

The appliance may have secured to each of the forward corners a base as shown in FIG. 16 the bases being secured so that the operating lever 86 of each base is disposed outwardly of the appliance, the rearward corners of the appliance being provided with rollers in the manner previously described, the arrangement being such that with the forward portion of the appliance supported by the support members 71 in respect of each of the bases 70 secured to the forward part of the said appliance, that is to say, with the lever 86 in the inoperative position, it is necessary to bring two levers 86 to an operative position in order to bring the bases 70 to a condition to permit translational movement of the appliance.

In the embodiment illustrated in FIGS. 17 to 20 of the accompanying drawings, the base 100 comprises a support member 101 formed by a mild steel rectangular support bracket having a pair of elongate substantially vertical sides 102, a top 103 and a base 104, the base 104 of the bracket projecting forwardly of the remainder of the bracket. Each side 102 is provided with an elongate vertically disposed slot 105 extending downwardly from a point mid-way between the top 103 and the base 104 of the bracket. The slots 102 accommodate a horizontally disposed axle 106 carrying externally of the support bracket 101 and at each end of the axle 106, a roller 107 mounted for rotation with respect to the axle 106. The axle 106 is capable of restricted vertical movement in said elongate slots 105 with respect to the bracket 101. The portion of the axle 106 extending within the bracket 101 and between the slots 105 carries a fixed upwardly projecting inverted U-shaped member 108, the arms 109 of which are each secured to the axle 106. The intermediate portion 110 of the U-shaped member 108 bridging said arms 109 carries a vertically disposed shaft 111 which slidably engages a mild steel bridge-element 112 extending across the support bracket 101 between the sides 102 thereof and which is preferably welded to one or both of the sides 102 of the support bracket 101.

The operating means comprises a cranked handle 113 drilled at a point mid-way between the handle 113 and the extremity of the cranked portion 114, said cranked portion 114 carrying towards the end thereof a first cam portion 115 said handle 113 being mounted for rotation about said vertically disposed shaft 111 with the first cam portion 115 on the crank 114 projecting upwardly. Said first cam portion 115 comprises a cam surface which slopes from the side 116 of the cranked portion 114 remote from the handle 113 downwardly towards the side 117 of the cranked portion 114 nearer the handle 113, and having a pitch which lies in the vertical plane substantially parallel to the longitudinal axis of the handle 113. The handle 113 itself is thicker than the cranked portion 114 and is bevelled at the junction with the cranked portion 114 to form a second cam portion 118 sloping downwardly from the handle 113 towards the end 119 of the handle 113 adjacent the cranked portion 114 so that the pitch of the slope lies in a substantially vertical plane containing the longitudinal axis of the handle. The slope of the second cam portion 118 is opposed to the slope of the first cam portion 115 so that said first and second cam portions 115, 118 are diametrically disposed about the point of rotation of the cranked portion 114 about the vertical shaft 111. The operating handle 113 and cranked portion 114 is mounted for horizontal rotation about said vertical shaft 111 and is disposed between the bridge element 112 and the U-shaped bracket 108.

The top 103 of the support bracket 101 is provided in its centre with an upwardly projecting threaded member 120 for securing the support bracket 101 to a domestic appliance, in this case, a gas cooker.

A base 100 is secured to each of the front corners of a gas cooker having a substantially rectangular or square base, the rear corners of the cooker being supported on rollers mounted for rotation between the arms of an inverted U-shaped bracket, the intermediate portion of which carries an upstanding threaded element attached to the base of the cooker at each of the rear corners.

The transport device 100 described above is fitted to the cooker so that the projecting portion of the base 104 of the support bracket 101 projects forwardly of the support bracket 101 to reduce the possibility of the appliance being tilted when the base 104 of the support bracket 101 is in frictional contact with the surface on which the cooker stands. In this condition, the operating lever 113 is in an inoperative position (see FIGS. 17, 18 and 19) and the axle 106 carrying the rollers 107 is disposed towards the upper end of the elongate slots 105 in the side walls 102 of the bracket 101.

When it is desired to move the cooker, movement of the operating handle 113 in an arc about the vertical shaft 111 brings said cam surfaces 115, 118 into abutment with the bridge element 112 between the side walls 102 of the bracket 101. Continued rotation of the operating handle 113 towards the operative position causes the bridge element 112 to act on said cam surfaces 115, 118 to move the handle 113 and its cranked portion 114 downwardly so that with the underside of the cranked portion 114 bearing against the upper surface of the intermediate portion 110 of the U-shaped bracket 108 attached to the axle 106, the downward motion of the handle 113 is transmitted to the axle 106 carrying the rollers 107. In the operative position, the rollers 107 are in supporting contact with the surface on which the gas cooker stands and the base 104 of the bracket 101 is out of frictional contact with said surface.

Similarly by moving the operating handle of the other base 100, attached to the front of the cooker, to an operative position, the cooker is wholly supported on rollers and is then capable of translational movement with respect to the surface on which it stands.

To render the cooker immobile, the operating levers 113 of each of the two devices are moved to the inoperative position whereon, as a result of the reaction due to the weight of the cooker on the rollers 107, the cam surfaces 115, 118 on the cranked portion 114 of the handle 113 bearing against the bridge element 112 in each of the support brackets 101 attached to the front of the cooker allows upward movement of the cranked portion 114 of the handle 113 and corresponding upward movement of the axle 106 supporting the rollers 107 until the base 104 of the support bracket 101 is in frictional contact with the surface on which the cooker stands thereby preventing translational movement of the cooker.

Figure 21:
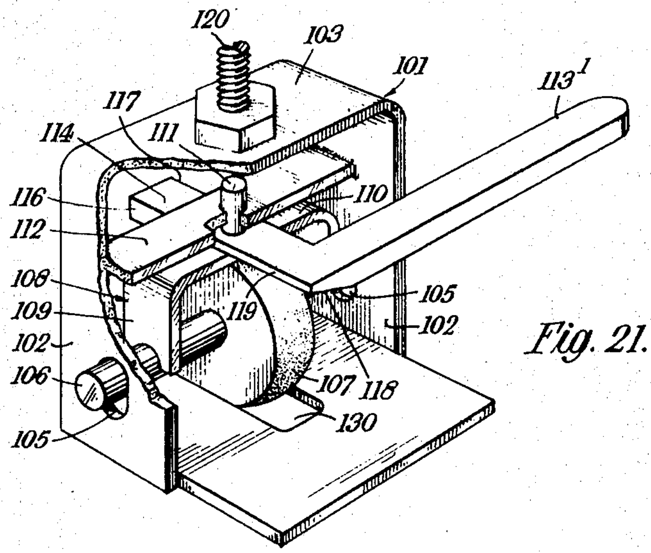
FIG. 21 is an alternative embodiment of the device illustrated in FIGS. 17 to 20.

In an alternative embodiment shown in FIG. 21 of the device 100 described with respect to FIGS. 17 to 20 of the accompanying drawings the centre of the base 104 of the support bracket 101 described in the previous embodiment is cut away to form an elongate slot 130 extending in a forward-rearward direction and of sufficient width to accommodate a roller 107 and to permit a segment of said roller 107 to project through the base portion 104 of the bracket 101 in order to raise the support bracket 101 from the surface in response to operation of the operating handle 113. The support bracket 101 is provided with a pair of vertically disposed elongate slots 105 in the side walls 102 which slots 105 accommodate an axle 106.

The axle 106 is attached to the lower ends of depending spaced arms 109 of an inverted U-shaped bracket 108. The intermediate portion 110 of the U-shaped bracket 108 carries an upstanding vertical shaft 111 which engages a bridge element 112 so that said vertical shaft 111 and the U-shaped bracket 108 attached thereto are capable of limiting vertical sliding movement with respect to said bridge element 112 and the support bracket 101. The roller 107 is rotatably mounted on said axle 106 between the downwardly depending arms 109 of the inverted U-shaped bracket 108. The operating handle 113 described with respect to the previous embodiment is disposed between the bridge element 112 and the upper surface of the intermediate portion 110 of the inverted U-shaped bracket 108 carrying the axle 106 with the cam surfaces 115, 118 disposed downwardly of the cranked portion 114. In the inoperative position the upper surface of the cranked portion 114 of the handle 113 bears lightly against the bridge element 112 and the cam surfaces 115, 118 and/or the under surface of the cranked portion 114 abuts the upper surface of the intermediate portion 110 of said U-shaped bracket 108.

On fitting the transport apparatus of this embodiment to each of the front corners of the gas cooker as described with respect to the previous embodiments, when it is desired to move the cooker, movement of the operating handle 113 from the inoperative position rotatably about said vertical shaft 111 towards the operative position, the cam surfaces 115, 118 of the cranked portion 114 of the operating handle 113 abuts the intermediate portion 110 of the U-shaped bracket 108. Continued rotational movement of the operating handle 113 causes the U-shaped bracket 108 carrying the axle to move downwardly with respect to the support bracket 101, thereby urging the roller 107 carried on said axle 106 downwardly through to the elongate slot 130 in the base 104 of the support bracket 101 so that when the operating handle 113 is in the operative position, the base 104 of the support bracket 101 is raised clear of the surface on which the cooker stands and the roller 107 is in rolling contact with the surface. The cooker is then capable of translational movement with respect to the surface on which it stands. On moving the handle 113 to the inoperative position, the roller 107 is withdrawn through the elongate slot 130 in the base 104 of the support bracket 101 and the base 104 of the support bracket 101 is brought into frictional contact with the surface on which the cooker stands thereby preventing translational movement of the cooker.

By using transport devices of the type described above it is possible to impart to gas cookers and similar domestic appliances an ease of mobility not hitherto available and there is no need to employ fixing or latching means for securing the appliance in use.

We claim:

1. A transport device adapted to be secured to a domestic appliance to render it mobile, said device comprising a support structure including a pair of brackets, each said bracket having means to fixedly secure it to the base of the appliance, each said bracket having a ground-engaging friction foot, said support structure further including a spacing element interconnecting said brackets; a pair of rollers, each roller being positioned adjacent a respective one of the brackets; roller support means having said rollers rotatively mounted thereon, said roller support means being movably mounted on the support structure to permit simultaneous vertical movement of said rollers relatively to the friction feet; operating means mounted on the support structure including a lever swingable through a substantial angle about an axis transverse to said spacing element; cam means operatively connected to said roller support means to effect said movement of the roller support means relatively to the support structure between an inoperative position in which the pair of rollers are vertically above the level of the friction feet and an operative position in which the rollers are held below the level of the friction feet.

2. A transport device according to claim 1, wherein said spacing element includes rods secured to and extending from the brackets and a central sleeve having said rods engaged in opposite ends thereof.

3. A transport device according to claim 2, each said bracket being rectangular in section and having a centrally disposed, upstanding screw-threaded member by which the device is secured to the appliance, said rods extending through the brackets.

4. A transport device according to claim 1, said lever having a cam formed on it adjacent the axis about which it swings, said cam, constituting part of said cam means, acting directly on the roller support means.

5. A transport device according to claim 4, comprising a vertical pivot shaft extending through the spacing element, said lever being swingable on said pivot shaft and in a horizontal plane.

References Cited

UNITED STATES PATENTS

| | | | |
|---|---|---|---|
| 2,763,491 | 9/1956 | Thorwaldson | 280—35 |
| 2,572,348 | 10/1951 | Johnson | 280—43.24 |
| 2,964,327 | 12/1960 | Mohr | 280—43.24 |

LEO FRIAGLIA, Primary Examiner

R. R. SONG, Assistant Examiner